Figure 7:
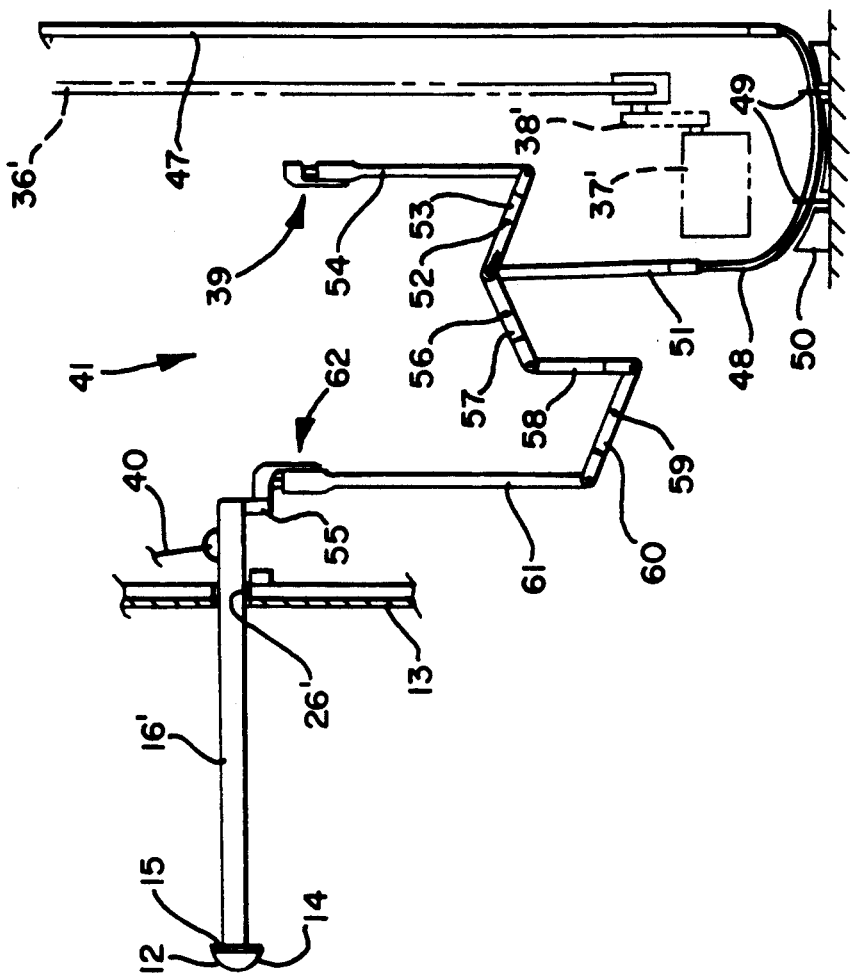

United States Patent [19]

Yamazaki

[11] Patent Number: 5,004,281

[45] Date of Patent: Apr. 2, 1991

[54] AUTOMOBILE SIDE DOOR EXTENDABLE AND RETRACTABLE BUMP PROTECTOR

[76] Inventor: Toshio Yamazaki, 7725 Manderville, #205, Dallas, Tex. 75231

[21] Appl. No.: 294,189

[22] Filed: Jan. 9, 1989

[51] Int. Cl.⁵ .............................................. B60R 19/38
[52] U.S. Cl. .................................... 293/118; 293/128
[58] Field of Search ...................... 293/1, 102, 118, 128

[56] References Cited

U.S. PATENT DOCUMENTS

| | | | |
|---|---|---|---|
| 2,512,527 | 6/1950 | Hoffman | 293/128 X |
| 3,084,517 | 4/1963 | Bell | 293/128 X |
| 3,131,960 | 5/1964 | Popp | 293/1 |
| 3,243,222 | 3/1966 | Loughary et al. | 293/1 |
| 3,280,510 | 10/1966 | Vaux | 293/1 |
| 3,843,475 | 10/1974 | Kent | 293/1 |
| 4,221,412 | 9/1980 | Miller | 293/128 X |
| 4,234,222 | 11/1980 | Bays | 293/128 X |
| 4,260,655 | 4/1981 | Zoller | 293/128 X |
| 4,461,503 | 7/1984 | Melby | 293/128 X |

FOREIGN PATENT DOCUMENTS 1430872 12/1968 Fed. Rep. of Germany ...... 293/128

Primary Examiner—Johnny D. Cherry
Assistant Examiner—Gary C. Hoge

[57] ABSTRACT

Door mounted extendable protectors for protection against damage from bumping by an opening door of another vehicle parked closely adjacent in side by side relation. Resilient bumper elements are mounted outside each car door extended substantially the front to back length of the door. The door extending mechanism is connected via bumper element mounting rods that extend from connection to the extending mechanism out through the outer sheet metal skin of the door to connection with the bumper element. In one embodiment the door bumper extending mechanism is also a retracting mechanism while in another embodiment the bumper element must be manually returned to the retracted state flush against the door when the extending mechanism is not activated.

9 Claims, 3 Drawing Sheets

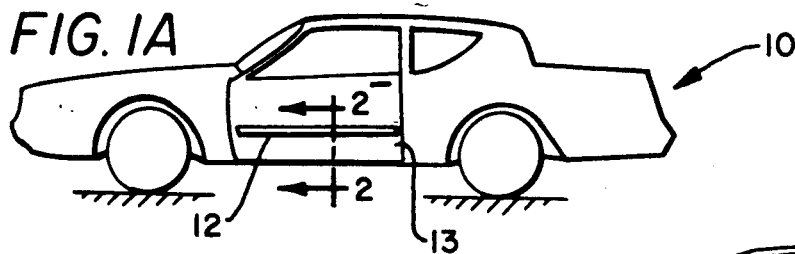
FIG. 1A
FIG. 1B
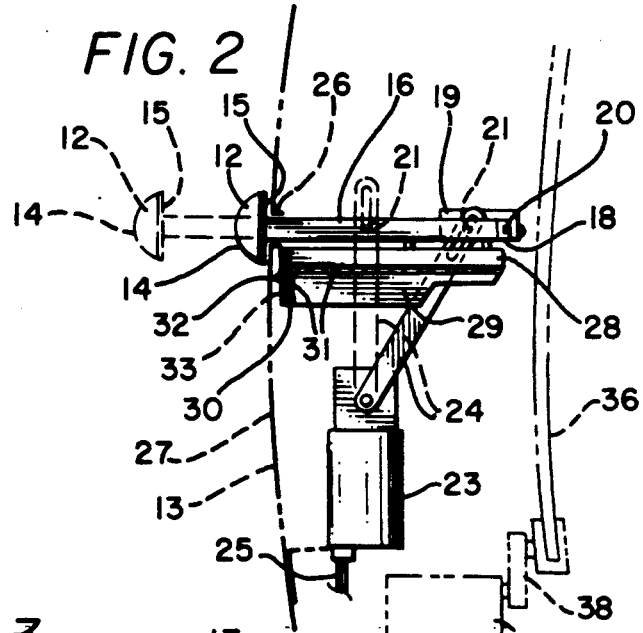
FIG. 2
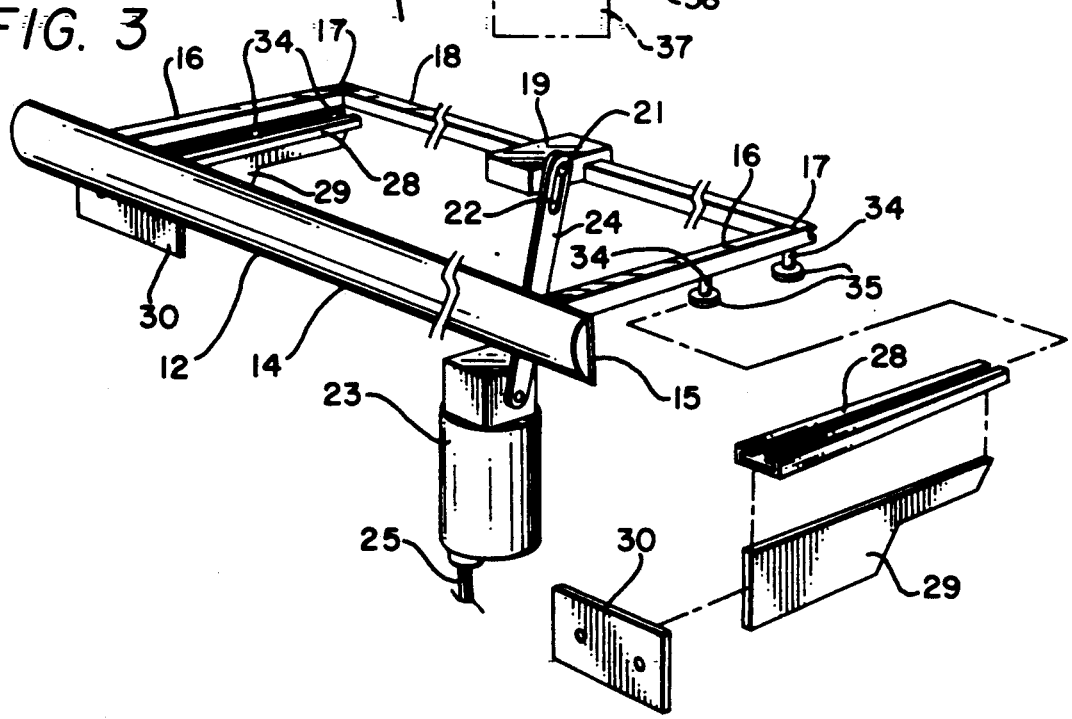
FIG. 3

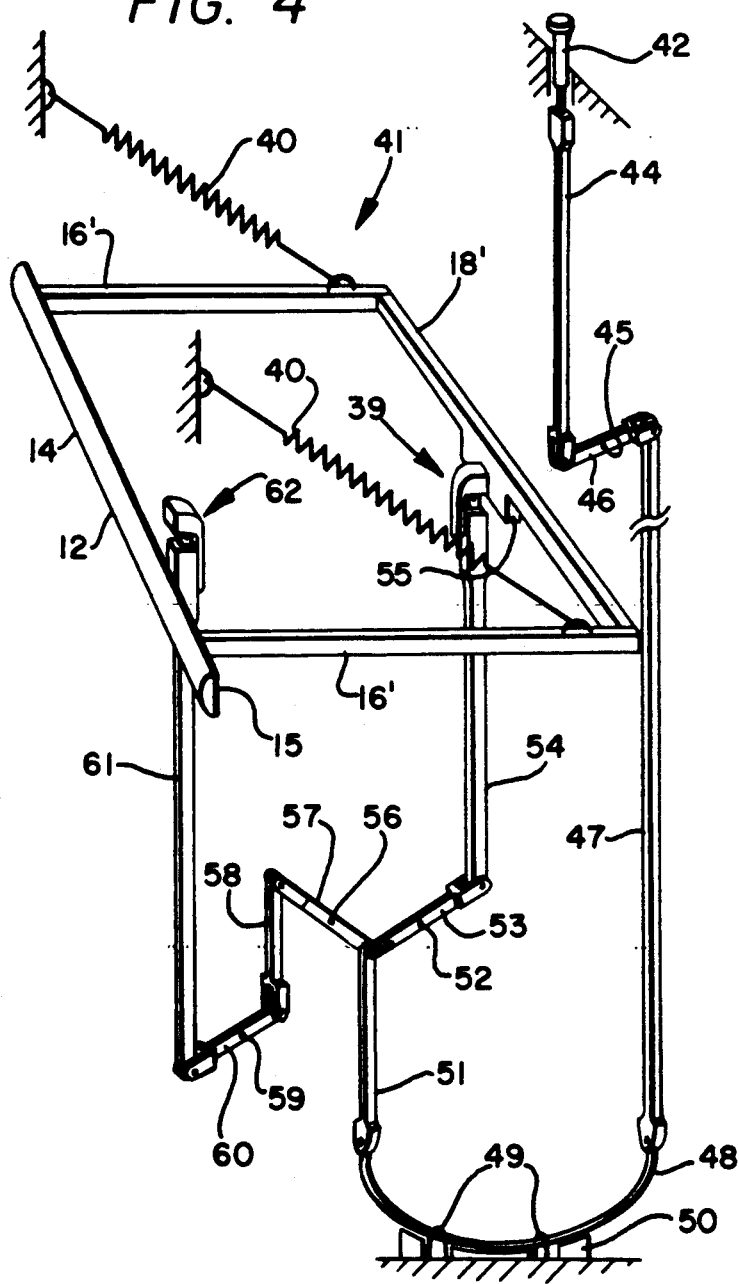
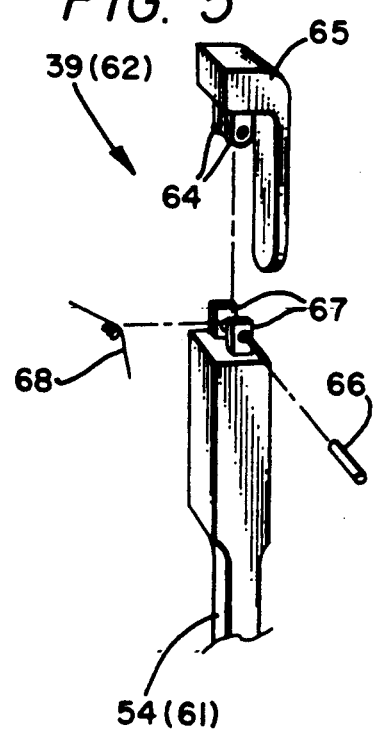
FIG. 4
FIG. 5

AUTOMOBILE SIDE DOOR EXTENDABLE AND RETRACTABLE BUMP PROTECTOR

This invention relates in general to automobiles side door bumper guards, and more particularly, to a car door extendable and retractably mounted bump protector from the opening door damage by side by side parked automobiles.

Protecting the side body of cars especially the door areas from being dinged by an opening door of an adjacent side by side parked automobile is quite a problem. Conventional door mounted bumpers give some protection but with different car door configurations and heights between vehicles there can be some car door denting and paint chipping from hitting impact by a car door of another car being opened. Extension of bumpers on car doors further out to the side from the car doors would help a great deal in reducing car side denting from opening doors of a car parked at the side of a car otherwise subject to such car door impact damage.

It is therefore a principal object of this invention to provide improved protection for car doors from impact denting damage from vehicle doors being opened of cars or trucks parked next to the car protected.

Another object is to provide such improved protection for car doors with a bumper that is extendable for protection more than flush mounted bumpers.

A further object with such a bumper is to provide a bumper extendable to an outer protective position when the vehicle is parked.

Still another object is to provide such an extendable position bumper that is retractable to a flush drive state when the car is to be driven.

Features of the invention useful in accomplishing the above objects include, in an automobile side door extendable and retractable bump protector from opening car doors of other vehicles, door mounted extendable protectors for protection against damage from bumping by an opening door of another vehicle parked closely adjacent in side by side relation. Resilient bumper elements are mounted outside each car door extended substantially the front to back length of the door. The door extending mechanism is connected via bumper element mounting rods that extend from connection to the extending mechanism out through the outer sheet metal skin of the door to connection with the bumper element. In one embodiment the door bumper extending mechanism is also a retracting mechanism while in another embodiment the bumper element must be manually returned to the retracted state flush against the door when the extending mechanism is not activated. One of the door bumper extending mechanism is an electric motor driven mechanism that is also a retracting mechanism, and the other door bumper mechanism is a manual latch release and spring driving bumper extension structure both being primarily in the door structures.

Specific embodiments representing what are presently regarded as the best modes of carrying out the invention are illustrated in the accompanying drawings.

Figure 6:
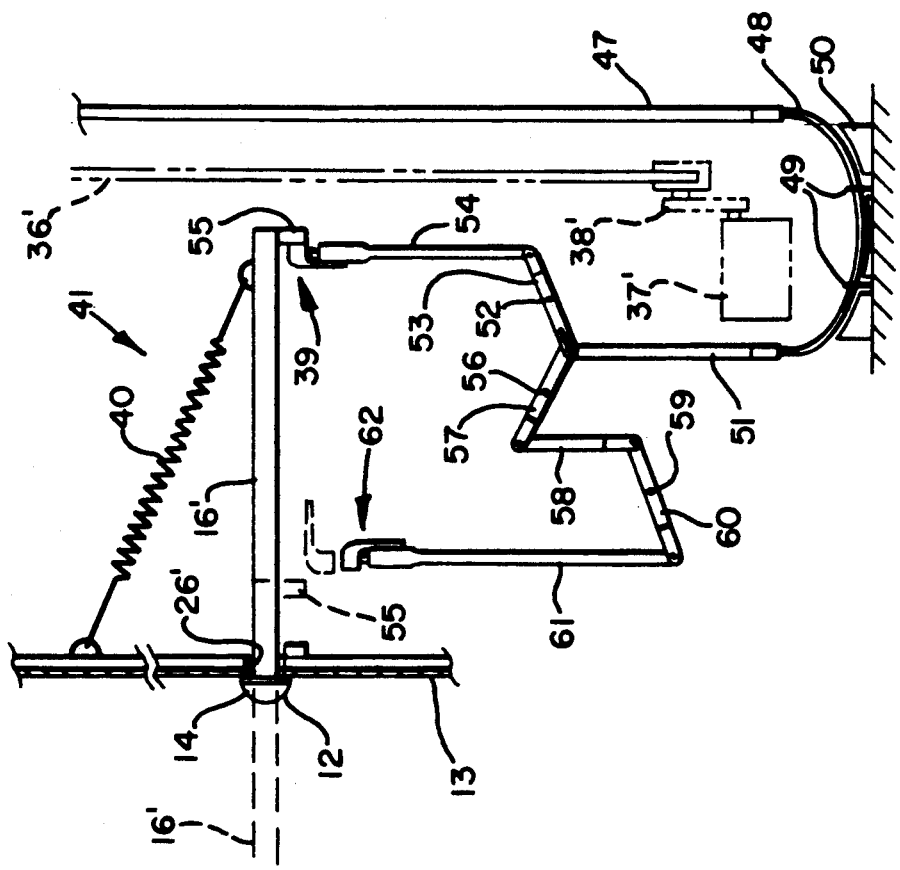

In the drawings:

FIGS. 1A and 1B represent side elevation views, respectively, of two door and four door automobiles;

FIG. 2, a partial cut away view taken along line 2—2 of FIG. 1A showing extendable position door bumper and in the door power drive mechanism detail;

FIG. 3, a partially exploded perspective view of the extendable position door bumper and the door power drive mechanism of FIG. 2;

FIG. 4, a perspective view of an extendable position door bumper guard and the in the door manual latch lease and spring driving bumper extension structure;

FIG. 5, an exploded perspective view showing detail of a latch from the embodiment of FIG. 4;

FIG. 6, a partial end elevation view of the extendable position door bumper guard and the in the door latch release and spring driving bumper extension structure in the retracted latched state; and FIG. 7, a partial end elevation view of the extendable position door bumper guard and the in the door latch structure with the spring driving bumper extension structure in the extended latched state.

Referring to the drawings:

The two door automobile 10 of FIG. 1A and the four door automobile 11 of FIG. 1B are both equipped with extendable position door bumper guards 12 and 12' on doors 13 and car 11 or rear door 13'. With reference also to FIGS. 2 and 3 the extendable position door bumper guard 12 resilient bumper member 14 is mounted on plate 15 that is fastened to the outer ends of spaced parallel bars 16 that are interconnected at the bar rear ends 17 by extender frame cross member 18. Drive interconnect block 19 has a notch 20 connection with cross member 18 and a drive pin 21 extended into slot 22 of motor 23 driven drive arm 24. The motor 23 mounted within the door is driven one way or the other with control driving power through multi-wire cable 25 to drive the extender frame bars 16 outward through openings 26 in the outer sheet metal skin 27 of the door to drive the door bumper guard 12 to the extended position shown in phantom in FIG. 2 and in reverse back to the retracted state with plate 15 close to if not in the flush state with the door outer sheet metal skin 27. Opposite side guide groove channels 28 are mounted within the door 13 with brackets 29 and 30 in a welded 31 together assembly bolted 32 to an internal flange 33 within the door 13. Support and motion guide assemblies 34 with rollers 35 are mounted two each to the bottoms of square bars 16 in spaced relation to fit within and roll (slide) along opposite side guide groove channels 28. This provided guided support for the extender frame cross member 18 and bars 16 throughout their back and forth range of movement between the bumper guard 12 extended state and the retracted state. The in the door bumper guard 12 driving mechanism is mounted to clear door window glass 36 that is raised and lowered by window drive motor 37 and drive arm 38 also mounted within the door.

With the manually actuated extendable position door bumper guard 12 manual latch 39 release and resilient tension spring 40 driving bumper guard extension structure 41 of FIGS. 4-7 the actuating button 42 is pulled upward at the inside of the car door 13. This upward movement of the buttom 43 draws rod member 44 upward that is translated through pivot pin 45 mounted lever 46 to downward movement of rod 47. This movement is translated through cable section 48, as guided through "U" restraints 49 and curved guide block 50, to upward movement of rod 51. This rod 51 upward movement translates through pivot pin 52 mounted lever 53 to movement of rod 54 downward and movement of latch 39 downward to a latch release position below and no longer in restraining latched contact with pad 55 of extender frame cross member 18' in order that it along with spaced parallel bars 16' be moved from the retracted state to the bumper guard 12 extended state by the tension springs 40. Upward movement of rod 51 also translates through pivot pin 56 mounted lever 57 to movement of rod 58 downward and thereby rotation of pivot pin 59 mounted lever 60 to move rod 61 and latch 62 upward into the bumper guard 12 latch position behind pad 55 in translation of the bumper guard extension structure 41 from the latch 39 restrained retracted state of FIGS. 4 and 6 to the extended latched state of FIG. 7. The levers 46, 53, 57 and 60 all have pivotal connections with opposite end rods interconnected thereby. Each of the latches 39 and 62 have a pivotal connection pedestal 64 frame under a top latch member 65 that is pivotally connected via a pivot pin 66 with top prongs 67 of a rod 54 or 61, respectively. Latch bias spring 68 mounted on pivot pin 66 in each latch 39 and 62 biases the top latch member 65 to the latched state. The door bumper guard 12 driving mechanism 41 of this embodiment is so mounted and configured as to clear door window glass 36' that is raised and lowered by window drive motor 37' and drive arm 38' also mounted within the door. It should be noted that when the activating button 42 is pushed down returning the driving mechanism linkage from the state of FIG. 7 to that of FIGS. 4 and 6 the bumper guard 12 must be manually pushed inward against the resilient force of springs 40 until latch 39 is snapped to the latched state against the forward face of pad 55.

Whereas this invention has been described with respect to several embodiments thereof, it should be realized that various changes may be made without departure from the essential contributions to the art made by the teachings hereof.

I claim:

1. A vehicle side door extendable and retractable bump protector comprising: elongate bumper guard means extending substantially the front to rear length of a vehicle side door; spaced parallel bars extending from inside the vehicle side door and moveable back and forth through openings in the door outer skin surface mounting said elongate bumper guard means on the bar outer ends; drive means within said vehicle side door; and interconnect means between said drive means and said spaced parallel bars for driving of said elongate bumper guard means from a retracted position adjacent the door outer skin surface to an extended position; wherein said interconnect means includes, a cross member interconnecting the rear ends of said spaced parallel bars; a drive motor; motion translating means inteconnecting said drive motor and said cross member for driving said spaced parallel bars and said elongate bumper guard means from a retracted position adjacent to the door outer skin surface to an extended position and then back to the retracted position with reverse controlled drive of said drive motor; motion translating means includes a drive arm mounted on and driven by said drive motor; and a slot and pin interconnect between said drive arm and said cross member; mount means on said cross member mounts the pin of said slot and pin interconnect with the slot in the outer end of said drive arm; said elongate bumper guard means includes an elongate plate and resilient bumper member mounted on said elongate plate; and with said elongate plate mounted on the outer ends of said spaced parallel bars; and wherein said mount means on said cross member is a notched block fixed in place on said cross member; and with said cross member a rectangular bar.

2. A vehicle side door extendable and rectractable bump protector comprising: elongate bumper guard means extending substantially the front to rear length of a vehicle side door; spaced parallel bars extending from inside the vehicle side door; spaced parallel bars extending from inside the vehicle side door and moveable back and forth through openings in the door outer skin surface mounting said elongate bumper guard means on the bar outer ends; drive means within said vehicle side door; and interconnect means between said drive means and said spaced parallel bars for driving of said elongate bumper guard means from a retracted position adjacent the door outer skin surface to an extended position; wherein said interconnect means includes, a cross member interconnecting the rear ends of said spaced parallel bars; a drive motor; motion translating means interconnecting said drive motor and said cross member for driving said spaced parallel bars and said elongate bumper guard means from a retracted position adjacent to the door outer skin surface to an extended position and then back to the retracted position with reverse controlled drive of said drive motor; said motion translating means includes a drive arm mounted on and driven by said drive motor; and a slot and pin interconnect between said drive arm and said cross member; mount means on said cross member mounts the pin of said slot and pin interconnect with the slot in the outer end of said drive arm; and wherein said spaced parallel bars have support and motion guide means mounted to the bottoms thereof; and guide structure means mounted within the door for guided support of said spaced parallel bars, said cross member and said elongate bumper guard means as a moveable frame moveable back and forth between an extended position and a retracted position.

3. The vehicle side door extendable and retractable bump protector of claim 2, wherein said guide structure means includes spaced parallel guide channels and bracket mount means mounted within the door supporting said spaced parallel guide channels; and said support and motion guide means are rollers with mounting pins mounted to the bottoms of said spaced parallel bars with said rollers received, supported and guided in back and forth motion in said spaced parallel guide channels.

4. The vehicle side door extendable and retractable bump protector of claim 3, wherein other than the portions of said spaced parallel bars extending through openings in the door outer skin surface and the elongate bumper guard means mounted thereon the vehicle side door extendable and retractable bump protector structure contained within the door is contained within space between lowered door window glass and the outer skin of the door.

5. A vehicle side door extendable and retractable bump protector comprising: elongate bumper guard means extending substantially the front to rear length of a vehicle side door; spaced parallel bars extending from inside the vehicle side door and moveable back and forth through openings in the door outer skin surface mounting said elongate bumper guard means on the bar outer ends; drive means within said vehicle side door; and interconnect means between said drive means and said spaced parallel bars for driving of said elongate bumper guard means from a retracted position adjacent the door outer skin surface to an extended position; wherein said drive means is resilient spring means; and said interconnect means includes connection of spring end means to said spaced parallel bars and connection of said resilient spring means to structure of the door; and wherein a cross member interconnects the rear ends of said spaced parallel bars; latch means for latched holding of said cross member and thereby holding of the door extendable and retractable elongate bumper guard means in the retractable position and manual latch means including linkage structure interconnecting said latch means and a door window sill mounted latch activating button.

6. The vehicle side door extendable and retractable bump protector of claim 5, wherein motion translation means interconnects said latch activating button and a length of cable connected at the other end to an upwardly extended rod; pivotally mounted lever means pivotally connected to both said upwardly extended rod and a latch rod; and guide means for said length of cable in translation of downward movement of one end of said cable to upward movement of the other end of said cable in translation of downward unlatching movement of said latch means for unlatching release and movement of said elongate bumper guard means to the extended state.

7. The vehicle side door extendable and retractable bump protector of claim 6, wherein the extendable and retractable bump protector structure also includes an extended position holding latch; an upward and downward moveable latch rod; and linkage interconnection means between said upwardly extended rod and said upward and downward moveable latch rod.

8. The vehicle side door extendable and retractable bump protector of claim 7, wherein said cross member includes latch pad means having front and back faces; and with engagement of said latch means with said front face of said latch pad means in the retracted latched state.

9. The vehicle side door extendable and retractable bump protector of claim 8, wherein said extended position holding latch is in engagement with the back face of said latch pad means in the extended latched state.

* * * * *